3,385,886
PHENYL PROPIONIC ACIDS
John Stuart Nicholson and Stewart Sanders Adams, Nottingham, England, assignors to Boots Pure Drug Company Limited, Nottingham, England, a British company
No Drawing. Continuation-in-part of application Ser. No. 167,941, Jan. 22, 1962. This application July 23, 1963, Ser. No. 296,914
Claims priority, application Great Britain, Feb. 2, 1961, 3,999/61; July 26, 1962, 28,780/62
1 Claim. (Cl. 260—515)

This application is a continuation-in-part of S.N. 167,941, filed Jan. 22, 1962, now U.S. Patent No. 3,228,831.

This invention relates to phenylalkane derivatives. More particularly it relates to novel pharmaceutical and veterinary compositions which comprise as the active ingredient one or more members of a specified group of derivatives of toluene. The invention also relates to the provision of novel members of this specified group of compounds. In another aspect, the invention relates to the treatment of diseases in human beings and animals.

It is an object of the invention to provide therapeutic compositions for the relief of pain, fever and inflammation in man and animals which do not suffer from the disadvantages of similar therapeutic compositions based on aspirin, phenylbutazone or adrenocorticosteroids.

We have now discovered that compounds of the general Formula I

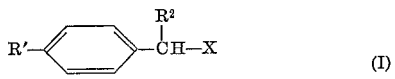

wherein R' represents alkyl ($C_3$–$C_4$), pentyl (except n-pentyl), alkylene ($C_2$–$C_4$), cycloalkyl ($C_5$–$C_7$) optionally substituted by a methyl group in the 1-position, alkoxy ($C_2$–$C_3$), alkylthio ($C_1$–$C_3$), allyloxy, phenoxy, phenylthio, cyclohexyloxy and cyclohexylthio when $R^2$ is hydrogen; or R' represents alkyl ($C_2$–$C_5$), branched alkyl ($C_6$–$C_7$), cycloalkyl ($C_3$–$C_7$) optionally substituted by a methyl group in the 1-position, alkoxy ($C_2$–$C_5$), alkylthio ($C_1$–$C_5$), alkenyloxy ($C_3$–$C_4$), alkenylthio ($C_3$–$C_5$), phenoxy, phenylthio, cycloalkyloxy ($C_3$–$C_7$), cycloalkylthio ($C_3$–$C_7$), alkylene ($C_2$–$C_4$) and halogen when $R^2$ is methyl; X represents $CH_2OH$, $COOR^3$ wherein $R^3$ represents hydrogen or alkyl ($C_1$–$C_4$) optionally substituted, and the non toxic inorganic and organic salts of the acids have valuable anti-inflammatory and/or analgesic and/or antipyretic properties. The compounds exhibit low toxicity and are stable in the presence of water.

According to the present invention there are provided therapeutic compositions comprising as active ingredient one or more compounds of the general Formula I in association with a pharmaceutically acceptable diluent or carrier.

The following compounds are typical of the active compounds of the general Formula I, but do not limit the invention in any way:

4-n-propylphenylacetic acid
4-ethoxyphenylacetic acid
4-n-isopropylphenylacetic acid
4-propoxyphenylacetic acid
4-isopropoxyphenylacetic acid
4-s-butylphenylacetic acid
4-allyloxyphenylacetic acid
4-t-butylphenylacetic acid
4-cyclopentylphenylacetic acid
4-isobutylphenylacetic acid
4-cycloheptylphenylacetic acid
4-cyclohexylphenylacetic acid
4-(1-ethylpropyl)phenylacetic acid
4-phenoxyphenylacetic acid
4-(1,2-dimethylpropyl)phenylacetic acid
4-phenylthiophenylacetic acid
2-4'-cyclohexylphenylpropionic acid
2-4'-isobutylphenylethanol
2-4'-cyclohexylphenylethanol
4-vinylphenylacetic acid
2-4'-isopentylphenylpropanol
Ammonium 4-t-butylphenylacetate
2-4'-cyclohexylphenylpropanol
4-(2,2-dimethylpropyl)phenylacetic acid
4-(1-methylcyclohexyl)phenylacetic acid
Ethyl 4-t-butylphenylacetate
4-(2-methylbutyl)phenylacetic acid
Sodium 2-4'-cyclohexylphenylpropionate
Methyl 4-t-butylphenylacetate
Sodium 4-t-butylphenylacetate
n-Propyl 2-4'-isopentylphenylpropionate
Butyl 4-t-butylphenylacetate
Isopropyl 4-t-butylphenylacetate
n-Propyl 4-t-butylphenylacetate
2-4'-t-butylphenylethanol
2-4'-isobutylphenylpropanol
2-4'-isobutylphenylpropionic acid
4-t-pentylphenylacetic acid
2-4'-(1-methylcyclohexyl)phenylethanol
2-4'-isopentylphenylethanol
Ethyl-4-isobutylphenylacetate
Benzylamine 4-t-butylphenylacetate
2-4'-t-butylphenylpropionic acid
2-4'-isopentylphenylpropionic acid
Ethyl 2-4'-isobutylphenylpropionate
n-Propyl 4-isopentylphenylacetate
2-4'-s-butylphenylpropionic acid
2-4'-(1-ethylpropyl)phenylpropionic acid
2-4'-(2-methylbutyl)phenylpropionic acid
2-4'-(2,2-dimethylpropyl)phenylpropionic acid
2-4'-(1-methylcychohexyl)phenylpropionic acid
2-4'-ethylphenylpropionic acid
2-4'-n-propylphenylpropionic acid
2-4'-isopropylphenylpropionic acid
2-4'-n-butylphenylpropionic acid
2-4'-s-butylphenylpropionic acid
2-4'-n-pentylphenylpropionic acid
2-4'-isopentylphenylpropionic acid
2-4'-t-pentylphenylpropionic acid
2-4'-(1,1-diethylethyl)phenylpropionic acid
2-4-'-cyclopentylphenylpropionic acid
2-4'-cycloheptylphenylpropionic acid According to the present invention there is also provided a method of treating inflammation, pain and fever in man and animals by administering a composition, comprising as active ingredient, one or more of the compounds of general Formula I.

We have discovered that the compounds which are the active components of the compositions of the present invention are superior to acetylsalicyclic acid in that they exhibit one or more of the following advantages:
 (a) They are less toxic;
 (b) They have a higher therapeutic ratio;
 (c) They are more stable in the presence of water or water vapour;
 (d) They are more soluble in water.

The alkali metal and alkaline earth metal salts of the acids are particularly soluble in water and they are valuable for the preparation of oral compositions.

The active compounds of the present invention may be prepared by methods which are well-known for the preparation of phenylacetic acids, phenylpropionic acids and derivatives thereof. Where these processes produce novel compounds, such novel compounds and processes for the preparation thereof are also part of the present invention.

In general the acids, salts and alcohols are relatively the most active compounds followed by the esters.

The invention also comprises new compounds falling within the general formula II:

(II)

wherein $R^4$ is isobutyl, s-butyl, t-butyl, pentyl (except n-pentyl), alkylene ($C_3$–$C_4$), cycloalkyl ($C_6$–$C_7$) 1-methylcycloalkyl ($C_5$–$C_7$), alkylthio ($C_2$–$C_3$), cyclohexyloxy and cyclohexylthio when $R^5$ is hydrogen; wherein $R^4$ is alkyl ($C_2$–$C_5$), branched alkyl ($C_6$–$C_7$), cycloalkyl ($C_3$–$C_7$) optionally substituted by a methyl radical in the 1-position, alkoxy ($C_3$–$C_5$), alkylthio ($C_1$–$C_5$), alkenyloxy ($C_3$–$C_4$), alkenylthio ($C_3$–$C_5$), phenoxy, phenylthio, cycloalkyloxy ($C_3$–$C_7$), cycloalkylthio ($C_5$–$C_7$) and alkylene ($C_2$–$C_4$), when $R^5$ is methyl and X represents $CH_2OH$, $COOR^3$ wherein $R^3$ is hydrogen of alkyl ($C_1$–$C_4$), optionally substituted and the inorganic and organic salts of the acids provided that $R^4$ is not t-butyl, t-pentyl or unsubstituted cyclohexyl when $R^5$ is hydrogen and X is COOH or $CH_2OH$; provided that $R^3$ is not ethyl when $R^5$ is hydrogen and $R^4$ is s-butyl, t-butyl, or t-pentyl; provided that $R^4$ is not cyclohexyl (unsubstituted when $R^5$ is hydrogen and X is $CH_2OH$); and provided that $R^4$ is not ethyl when $R^5$ is methyl and X is $CH_2OH$.

A list of methods suitable for preparing these compounds is given below. In these representations $R^4$ and $R^5$ are as hereinbefore defined for general Formula II and Ph represents phenyl or phenylene.

Acids (1)
$R^4.Ph \xrightarrow{HCl/H.CHO}{ZnCl_2} R^4.Ph.CH_2.Cl \longrightarrow$ $R^4.Ph.CH_2.Mg.Cl \xrightarrow{CO_2} R^4.Ph.CH_2COOH$ (2)
$R^4.Ph \xrightarrow{HCl/H.CHO}{ZnCl_2} R^4.Ph.CH_2Cl \longrightarrow$ $R^4.Ph.CH_2CN \xrightarrow{hydrolyse} R^4.Ph.CH_2COOH$ (3)
$R^4.Ph \xrightarrow{HCl/H.CHO}{ZnCl_2} R^4.Ph.CH_2Cl \longrightarrow$ $R^4.Ph.CH_2CN \xrightarrow{NaNH_2} R^4.Ph.CH.CN \xrightarrow{MeI} \longrightarrow$
$\quad\quad\quad\quad\quad\quad\quad\quad\quad\quad\quad |$
$\quad\quad\quad\quad\quad\quad\quad\quad\quad\quad\quad Na$

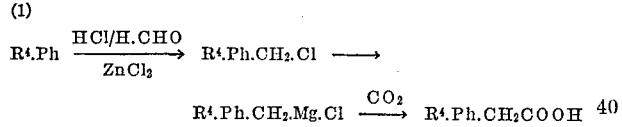

(4)
$R^4.Ph \xrightarrow{CH_3COCl}{AlCl_3} R^4.Ph.CO.CH_3 \xrightarrow{Willgerodt \text{ and hydrolyse}} R^4.Ph.CH_2.COOH$ (5)
$R^4.Ph.CH_2.COOEt \xrightarrow{(EtO)_2CO}{NaOEt} R^4.Ph.CH(COOEt)_2 \xrightarrow{MeI}{NaOEt}$ $R^4.Ph.C(COOH)_2 \xrightarrow{hydrolyse}$
$\quad\quad\quad |$
$\quad\quad\quad Me$ $R^4.Ph.CMe(COOH)_2 \xrightarrow{decarboxylate} R^4.Ph.CH.COO$
$\quad\quad\quad\quad\quad\quad\quad\quad\quad\quad\quad\quad\quad\quad\quad |$
$\quad\quad\quad\quad\quad\quad\quad\quad\quad\quad\quad\quad\quad\quad\quad CH_3$ (6)
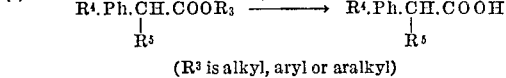
($R^3$ is alkyl, aryl or aralkyl)

(7)
$R^4.Ph.Br \longrightarrow R^4.Ph.MgBr \xrightarrow{CH_3.CO.COOEt}$ $R^4.Ph.C(OH).COOEt \xrightarrow{hydrolyse}$
$\quad\quad |$
$\quad\quad CH_3$ $R^4.Ph.C(OH).COOH \xrightarrow{P/I} R^4.Ph.CH.COOH$
$\quad\quad |\quad\quad\quad\quad\quad\quad\quad\quad\quad\quad\quad\quad |$
$\quad\quad CH_3\quad\quad\quad\quad\quad\quad\quad\quad\quad\quad CH_3$ (8)
$R^4.Ph.COCH_3 + HCN \longrightarrow R^4.Ph.C(OH).CH_3 \xrightarrow{HI/P}$
$\quad\quad\quad\quad\quad\quad\quad\quad\quad\quad\quad\quad\quad\quad |$
$\quad\quad\quad\quad\quad\quad\quad\quad\quad\quad\quad\quad\quad\quad CN$ $\quad\quad\quad\quad\quad\quad\quad\quad\quad\quad\quad\quad\quad\quad\quad R^4.Ph.CH.COOH$
$\quad\quad\quad\quad\quad\quad\quad\quad\quad\quad\quad\quad\quad\quad\quad\quad |$
$\quad\quad\quad\quad\quad\quad\quad\quad\quad\quad\quad\quad\quad\quad\quad\quad CH_3$ (9)
$R^4.Ph. + CH_3.CH.CN \xrightarrow{AlCl_3}$
$\quad\quad\quad\quad\quad\quad |$
$\quad\quad\quad\quad\quad O.SO_2C_6H_5$ $R^4.Ph.CH.CN \xrightarrow{hydrolyse} R^4.Ph.CH.COOH$
$\quad\quad |\quad\quad\quad\quad\quad\quad\quad\quad\quad\quad\quad |$
$\quad\quad CH_3\quad\quad\quad\quad\quad\quad\quad\quad\quad CH_3$

(10) Alcohols and aldehydes may be oxidised to the corresponding acids.

(11)
$R^4.Ph.COCH_3 \xrightarrow{Cl_2} R^4.Ph.COCHCl_2 \xrightarrow{Alkali}$ $R^4.Ph.CH.COOH \xrightarrow{HClO_4}{H_2} R^4.Ph.CH_2COOH$
$\quad\quad |$
$\quad\quad OH$ Esters (1)
$R^4.Ph.CH.COOH + R^3OH \xrightarrow{H_2SO_4} R^4.Ph.CH.COOR^3$
$\quad\quad |\quad\quad\quad\quad\quad\quad\quad\quad\quad\quad\quad\quad\quad\quad\quad\quad |$
$\quad\quad R^5\quad\quad\quad\quad\quad\quad\quad\quad\quad\quad\quad\quad\quad\quad\quad R^5$ (2)
$R^4.Ph.CH.COOH \longrightarrow R^4.Ph.CH.COCl \xrightarrow{R^3OH}$
$\quad\quad |\quad\quad\quad\quad\quad\quad\quad\quad\quad\quad\quad |$
$\quad\quad R^5\quad\quad\quad\quad\quad\quad\quad\quad\quad R^5$ $\quad\quad\quad\quad\quad\quad\quad\quad\quad\quad\quad\quad\quad R^4.Ph.CH.COOR^3$
$\quad\quad\quad\quad\quad\quad\quad\quad\quad\quad\quad\quad\quad\quad\quad |$
$\quad\quad\quad\quad\quad\quad\quad\quad\quad\quad\quad\quad\quad\quad\quad R^5$ (3)
$R^4.Ph. \xrightarrow{COCl.COOR^3} R^4.Ph.CO\cdot COOR^3 \xrightarrow{H} R^4.Ph.CH_2COOR^3$ 4)
$R^4.Ph.CH_2.COOR^3 \xrightarrow{NaH} R^4.Ph.CHNa.COOR^3 \xrightarrow{MeI}$ $\quad\quad\quad\quad\quad\quad\quad\quad\quad\quad\quad\quad\quad R^4.Ph.CH.COOR^3$
$\quad\quad\quad\quad\quad\quad\quad\quad\quad\quad\quad\quad\quad\quad\quad |$
$\quad\quad\quad\quad\quad\quad\quad\quad\quad\quad\quad\quad\quad\quad\quad CH_3$

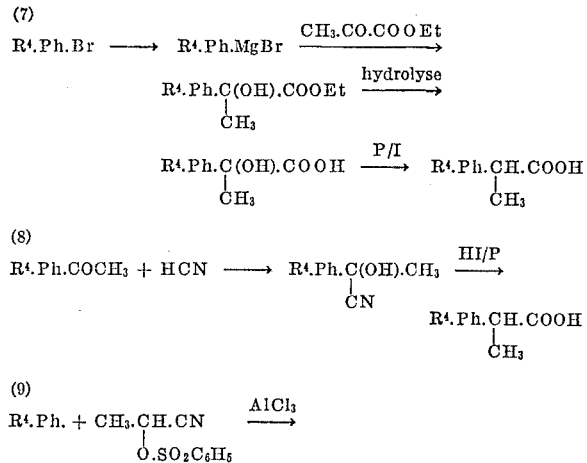

(7)
$R^4.Ph\cdot CH.COOH + \text{dialkylaminoalkyl halide} \longrightarrow$
$\quad\quad |$
$\quad\quad R^5$ $\quad\quad\quad\quad\quad\quad\quad\quad\quad \text{dialkylaminoalkyl ester hydrochloride}$ Alcohols (1)
$R^4.Ph. \xrightarrow{Cl} R^4.Ph.Cl \longrightarrow R^4.Ph.Mg.Cl \xrightarrow{\text{Ethylene oxide}}$ $\quad\quad\quad\quad\quad\quad\quad\quad\quad\quad\quad\quad\quad R^4.Ph.CH_2CH_2CH$ (2)
$R^4.Ph.CH.COOR^3 \xrightarrow{\text{hydrogenation}}$
$\quad\quad |$
$\quad\quad R^5$ $\quad\quad\quad\quad\quad R^4.Ph.CH.CH_2OH \quad (R^3 \text{ is H or alkyl})$
$\quad\quad\quad\quad\quad\quad |$
$\quad\quad\quad\quad\quad\quad R^5$ The hydrogenation takes place in the presence of catalysts e.g. $Li Al H_4$, or the ester is reduced with sodium to the alcohol (Bouveault-Blanc reaction).

The salts of the acids can be made by reacting the acids with organic or inorganic bases.

The pharmaceutically acceptable diluents or carriers which are admixed with the active compound to form the compositions of this invention are well-known and the actual excipients which are used depend inter alia on the method of administering the compositions. The compositions of this invention may be adapted for oral, topical or parenteral use but the preferred method of administration is per os. In this case the oral compositions may take the form of capsules, tablets, lozenges or effervescent granules, or liquid preparations such as mixtures, elixirs, syrups or suspensions, all containing one or more compounds of the aforementioned general formula; such preparations may be made by methods well-known in the art.

The diluents which may be used in the preparation of such compositions include those solid and liquid diluents which are compatible with the active ingredients together with colouring matter and flavouring if desired.

We have found that a tablet containing the active ingredient in the form of a salt in association with maize starch as a diluent is a particularly valuable and convenient composition. Such tablets disintegrate rapidly in the stomach and generally do not set up gastric irritation.

The compositions of the invention in the form of effervescent granules may comprise a compound of the above general formula in association with a combination of effervescing agents well-known in the art. Such an effervescent combination may include for example sodium bicarbonate in association with a free acid or acid salt such as tartaric acid or sodium acid tartrate.

The liquid compositions of the invention adapted for oral use may be in the form of solutions or suspensions. Such compositions in the form of solutions may be aqueous solutions of a soluble compound of the above general formula in association with, for example, sucrose to provide a syrup. The compositions in the form of suspensions may comprise an insoluble compound of the present invention in association with water together with a suspending agent, flavouring agents, colouring matter, etc.

The compositions of the invention which are adapted for topical use include ointments, creams and lotions containing compounds of the above general formula or their derivatives. Suitable ointments and creams may be water miscible or water immiscible in character and include emulsions prepared from emulsifying waxes and oils and also those prepared from water miscible polyethylene glycols. The lotions according to the invention may comprise a solution of the active ingredients of the above general formula in a suitable liquid solvent diluent which is preferably a lower aliphatic alcohol which may contain a small proportion of water.

The active ingredients of the present invention may also be incorporated into the novel compositions with other known therapeutically active compounds.

The screening test which was used to detect antiinflammatory activity was that described by Adams and Cobb, Nature, 1958, 181, 773.

Analgesic and antipyretic properties of the compounds were also assessed as were their toxicities on several types of animals, namely mice, rats, guinea pigs, cats and dogs. As is to be expected, the relative activities varied widely and for confirmation of the pharmacological activity in a clinical trial a compound having good all-round activity with low toxicity was chosen, namely 4-isobutylphenylacetic acid. The acute $LD_{50}$ for this compound with mice was 1300 mg./kg. orally and 600 mg./kg. i.p.; for rats the oral figure was greater than 1200 mg./kg. No toxic effects and no pathological changes were detected in rats fed daily on 200 mg./kg. of 4-isobutylphenylacetic acid for eight weeks.

The initial clinical trial was carried out in a controlled fashion using "double-blind" technique in which neither the patient nor the medical observer is aware of the drug being given during period of assessment. Twelve patients with acute rheumatoid arthritis involving multiple joints and with systemic febrile reaction were observed for a period of several weeks and complete symptomatic control was obtained with the oral administration of 30 grains daily of 4-isobutylphenylacetic acid in four divided doses. No toxic reactions were noted. The beneficial therapeutic effect of this treatment was indistinguishable from that obtained in the same patients with aspirin at a dose of 60 grains per day.

The evidence is that like aspirin the compounds of the present invention are useful in the treatment of (a) painful inflammation of the joints and periarticular tissues as occurs in rheumatoid arthritis, Still's disease and osteoarthritis; (b) various types of non-specific inflammatory or rheumatic conditions affecting the fibromuscular tissues and connective tissue; (c) rheumatic fever and its sequelae.

The following non-limitative examples illustrate the invention:

Example 1

4-isobutylacetophenone (49.4 g.), sulphur (13.6 g.) and morpholine (38 ml.) were refluxed for 16 hours; concentrated hydrochloric acid (344 ml.) and glacial acetic acid (206 ml.) were added and the mixture was refluxed for a further 7 hours. The mixture was cooled, diluted with water and the oil which separated was isolated with ether. The ethereal solution was extracted into aqueous sodium carbonate from which the crude acid was precipitated by addition of hydrochloric acid. The crude acid was again isolated with ether, the solution washed with water and evaporated to dryness to give a crystalline residue. The residue was crystallized from light petroleum (B.P. 40–60° C.) to give 4-isobutylphenylacetic acid M.P. 85.5–87.5° C. (Found: C, 75.1; H, 8.5. $C_{12}H_{16}O_2$ requires C, 75.0; H, 8.3%.)

The following compounds were made by the same method: 4-cycloheptylphenylacetic acid, M.P. 90.5–92.5° C. (Found: C, 77.3; H, 8.7. $C_{15}H_{20}O_2$ requires C, 77.6; H, 8.6%.) 4-(1-ethylpropyl)phenylacetic acid, B.P. 153–154° C./2.5 mm. (Found: C, 75.4; H, 8.6. $C_{13}H_{18}O_2$ requires C, 75.8; H, 8.7%.) 4-(1,2-dimethylpropyl)phenylacetic acid, B.P. 156–7° C./2.5 mm. (Found: C, 75.5; H, 8.6. $C_{13}H_{18}O_2$ requires C, 75.8; H, 8.7%.) 4-(2,2-dimethylpropyl)phenylacetic acid, M.P. 110.5–111° C. (Found: C, 75.6; H, 8.5. $C_{13}H_{18}O_2$ requires C, 75.8; H, 8.7%.) 4-(2-methylbutyl)phenylacetic acid, M.P. 38–40° C. (Found: C, 75.5; H, 8.7. $C_{12}H_{18}O_2$ requires C, 75.8; H, 8.7%.) 4-(1-methylcyclohexyl)phenylacetic acid, B.P. 194–6° C./3 mm. (Found: C, 77.8; H, 8.4. $C_{15}H_{20}O_2$ requires C, 77.6; H, 8.6%.) 4-isopentylphenylacetic acid, M.P. 62.5–63.5° C. (Found: C, 76.1; H, 8.6. $C_{13}H_{18}O_2$ requires C, 75.8; H, 8.7%.) 4-(1-methylbutyl) phenylacetic acid, B.P. 114° C./1.5 mm. (Found: C, 75.4; H, 8.6. $C_{13}H_{18}O_2$ requires C, 75.8; H, 8.7%.)

Example 2

4-s-butylacetophenone (40 g.) sulphur (11 g.) and morpholine (30 ml.) were refluxed for 16 hours, cooled, acetic acid (170 ml.) and concentrated hydrochloric acid (280 ml.) were added and the mixture was refluxed for a further 7 hours. The mixture was concentrated in vacuo to remove acetic acid and the concentration was diluted with water. The oil which separated was isolated with ether, the ethereal solution was extracted with aqueous sodium carbonate and this extract was acidified with hydrochloric acid. The oil was isolated with ether, evaporated to dryness and the residue was esterified by refluxing with ethanol (100 ml.) and concentrated sulphuric acid (3 ml.) for 5 hours. The excess alcohol was distilled off, the residue was diluted with water and the oil which separated was isolated with ether. The ethereal solution was washed with sodium carbonate solution, then with water and was dried. The ether was evaporated off and the oil was distilled to give ethyl 4-s-butylphenylacetate B.P. 114–166° C./1.5 mm. (Found: C, 76.4; H, 9.0. $C_{14}R_{20}O_2$ requires C, 76.4; H, 9.1%.)

Ethyl 4-s-butylphenylacetate (7.8 g.) was refluxed for 1 hour with sodium hydroxide solution (5 N 10 ml.) and methanol (10 ml.), acidified with hydrochloric acid and the oil which separated was isolated with ether. The ethereal solution was washed with water, dried and distilled to give 4-s-butylphenylacetic acid B.P. 134° C./0.5 mm. (Found: C, 74.9; H, 8.5. $C_{12}H_{16}O_2$ requires C, 75.0; H, 8.3%.)

In a similar manner, the following compound was prepared from the appropriate ester.

4-t-pentylphenylacetic acid B.P. 156° C./2.5 mm. (Found: C, 75.6; H, 8.6. $C_{13}H_{18}O_2$ requires C, 75.8; H, 8.7%.)

Example 3

4-t-butylphenylacetyl chloride (10.5 g.) was added dropwise to n-butanol (12 ml.) and the mixture was heated on the steam bath for 30 minutes. The product was distilled to give as a colourless oil butyl 4-t-butylphenylacetate B.P. 126° C./1 mm. (Found: C, 77.7; H, 9.6. $C_{16}H_{24}O_2$ requires C, 77.4; H, 9.7%.)

Similarly there was prepared: Methyl 4-t-butylphenylacetate, B.P. 106° C./2.5 mm. (Found: C, 76.1; H, 8.8. $C_{13}H_{18}O_2$ requires C, 75.8; H, 8.7%.) Isopropyl 4-t-butylphenylacetate, B.P. 114° C./1.5 mm. (Found: C, 76.6; H, 9.2. $C_{15}H_{22}O_2$ requires C, 77.0; H, 9.4%.) n-Propyl-4-t-butylphenylacetate. B.P. 112° C./1 mm. (Found: C, 76.9; H, 9.5. $C_{15}H_{22}O_2$ requires C, 77.0, H, 9.4%.)

Example 4

Sodium ethoxide from sodium 3.67 g. in absolute alcohol (64 ml.), was added over 20 minutes with stirring to a mixture of ethyl 4-t-butylphenylacetate (28.14 g.) and ethyl carbonate (102 ml.) at 100° C. The reaction flask was fitted with a Fenske column through which alcohol and then ethyl carbonate was distilled. After 1 hour when the still head reached 124° C. heating was discontinued. Glacial acetic acid (12 ml.) and water (50 ml.) was added to the stirred ice cooled mixture and the ester isolated in ether, washed with sodium carbonate solution, water and distilled to give ethyl 4-t-butylphenylmalonate, B.P. 144° C./1.5 mm. (Found: C, 70.4; H, 8.4. $C_{17}H_{24}O_4$ requires C, 69.9; H, 8.2%.)

Ethyl 4-t-butylphenylmalonate (27.53 g.) in absolute alcohol (25 ml.) was added with stirring to a solution of sodium ethoxide from sodium (2.17 g.) in absolute alcohol (75 ml.). Methyl iodide (15 ml.) was added and the mixture refluxed for 2½ hours, the alcohol distilled and the residue diluted with water, extracted with ether, washed with sodium bisulphite, water, and evaporated to dryness.

The residual oil was stirred and refluxed with sodium hydroxide (75 ml. of 5 N) water (45 ml.) and 95% ethanol (120 ml.). Within a few minutes a sodium salt separated and after 1 hour the solid was collected, washed with ethanol, dissolved in hot water and acidified with dilute hydrochloric acid to give the C-methyl malonic acid which was collected and dried in vacuo M.P. 177–180° (dec.).

The malonic acid (9 g.) was heated to 210–222° C. in an oil bath for 20 minutes until decarboxylation had ceased. The propionic acid was cooled and recrystallised from light petroleum (B.P. 60–80° C.).

Two further recrystallisations from the same solvent gave colourless prisms of 2-4′-t-butylphenylpropionic acid M.P. 101–103.5° C. (Found: C, 75.4; H, 8.7. $C_{13}H_{18}O_2$ requires C, 75.8; H, 8.7%.)

In the same manner the following were prepared: 2,4′-cyclohexylphenylpropionic acid, M.P. 110.5–112.5° C. (Found: C, 77.8; H, 8.1. $C_{15}H_{20}O_2$ requires C, 77.6; H, 8.6%.) 2,4′-isobutylphenylpropionic acid, M.P. 75–77.5° C. (Found: C, 75.3; H, 8.6. $C_{13}H_{18}O_2$ requires C, 75.8; H, 8.7%.) 2,4′-n-propylphenylpropionic acid, M.P. 39–40.5° C. (Found: C, 74.7; H, 8.6. $C_{12}H_{16}O_2$ requires C, 75.0; H, 8.3%.) 2,4′-isopropylphenylpropionic acid, M.P. 67.5–69.5° C. (Found: C, 75.2; H, 8.4. $C_{12}H_{16}O_2$ requires C, 75.0; H, 8.3%.) 2,4′-n-butylphenylpropionic acid, B.P. 143° C./0.5 mm. (Found: C, 76.6; H, 8.7. $C_{13}H_{18}O_2$ requires C, 75.8; H, 8.7%.) 2,4′-s-butylphenylpropionic acid, M.P. 48–50° C. (Found: C, 75.8; H, 8.8. $C_{13}H_{18}O_2$ requires C, 75.8; H, 8.7%.) 2,4′-n-pentylphenylpropionic acid, B.P. 154–155° C./1 mm. (Found: C, 76.0; H, 9.15. $C_{14}H_{20}O_2$ requires C, 76.4; H, 9.1%.) 2,4′-isopentylphenylpropionic acid, B.P. 139–140° C./0.8 mm. (Found: C, 76.3; H, 9.0. $C_{14}H_{20}O_2$ requires C, 76.4; H, 9.1%.) 2,4′-t-pentylphenylpropionic acid, B.P. 135° C./0.45 mm. (Found: C, 76.4; H, 9.0. $C_{14}H_{20}O_2$ requires C, 76.4; H, 9.1%.) 2,4′-(1,1-diethylethyl)phenylpropionic acid, B.P. 157° C./1.5 mm. (Found: C, 76.8; H, 9.3. $C_{15}H_{22}O_2$ requires C, 77.0; H, 9.4%.) 2,4′-cyclopentylphenylpropionic acid, M.P. 103–104° C. (Found: C, 77.0; H, 8.3. $C_{14}H_{18}O_2$ requires C, 77.0; H, 8.3%.) 2,4′-cycloheptylphenylpropionic acid, M.P. 97–98° C. (Found: C, 78.1; H, 9.0. $C_{16}H_{22}O_2$ requires C, 78.0; H, 8.9%.) 2,4′-ethylphenylpropionic acid, M.P. 34.5–37.5° C. (Found: C, 74.2; H, 8.0. $C_{11}H_{14}O_2$ requires C, 74.2; H, 7.9%.) 2,4′-phenoxyphenylpropionic acid, M.P. 69–70° C. (Found: C, 74.4; H, 58. $C_{15}H_{14}O_3$ requires C, 74.4; H, 5.8%.) 2,4′-(1,1-diethylpropyl)phenylpropionic acid, B.P. 180° C./0.05 mm. (Found: C, 77.8; H, 10.1. $C_{16}H_{24}O_2$ requires C, 77.4; H, 9.7%.) 2,4′-phenylthiophenylpropionic acid, M.P. 90–91° C. (Found: C, 69.2; H, 5.6. $C_{15}H_{14}O_2S$ requires C, 69.8; H, 5.4%.) 2,4′ - (1,1 - dimethylbutyl)phenylpropionic acid, M.P. 82–84.5° C. (Found: C, 77.1; H, 9.5. $C_{15}H_{22}O_2$ requires C, 76.9; H, 9.4%.) 2,4′-allyloxyphenylpropionic acid, M.P. 47.5–49° C. (Found: C, 70.4; H, 7.0. $C_{12}H_{14}O_3$ requires C, 69.9; H, 6.8%.) 2,4′-(but-2-enyloxy)phenylpropionic acid, M.P. 61.5–65° C. (Found: C, 70.9; H, 7.4. $C_{13}H_{16}O_3$ requires C, 70.9; H, 7.3%.) 2,4′-isopropoxyphenylpropionic acid, M.P. 73.5–76.5° C. (Found: C, 69.3; H, 7.8. $C_{12}H_{16}O_3$ requires C, 69.25; H, 7.7%.) 2,4′-propylthiophenylpropionic acid, B.P. 158–160° C./0.2 mm. (Found: C, 64.4; H, 7.3; S, 14.1. $C_{12}H_{16}O_2S$ requires C, 64.3; H, 7.1; S, 14.3%.)

Example 5

4-isobutylcyclohexanone (34.28 g.) A.R. zinc filings (16.0 g.) ethyl bromoacetate (26.5 ml.) and dry benzene (120 ml.) were warmed until a vigorous reaction set in which required external cooling. The mixture was then refluxed for 30 minutes, decomposed with ice cold dilute sulphuric acid, the benzene solution separated, washed with water, dried and evaporated. The residue (49 g.) dry pyridine (45 ml.) dry ether (93 ml.) were stirred with ice cooling and thionyl chloride (26 ml.) added dropwise over 30 minutes, the temperature being held below 12° C. After stirring for 2 hours at 0° C., water was cautiously added to the reaction mixture, the ethereal solution was washed with water, dried and ethyl 4-isobutylcyclohex-1-enylacetate was distilled; B.P. 106–109° C./2 mm. (Found: C, 75.0; H, 10.4. $C_{14}H_{24}O_2$ requires C, 75.0; H, 10.7%.)

Ethyl 4-isobutylcyclohex-1-enylacetate (8.0 g.) and sulphur (2.7 g.) were heated at 210° for 5 hours, then at 240° C. for 2 hours. Copper powder (100 mg.) was added and the heating continued for 5 minutes; the mixture was cooled, diluted with ether, filtered and ethyl 4-isobutylphenylacetate was distilled; B.P. 110° C./1 mm. (Found: C, 76.7; H, 9.2. $C_{14}H_{20}O_2$ requires C, 76.4; H, 9.1%.)

Example 6

4-isobutylbenzyl chloride (50 g.), sodium cyanide (16.1 g.), alcohol (100 ml.), water (30 ml.) were refluxed and stirred for 5 hours. The alcohol was distilled, the oil isolated in ether, washed with water and distilled; B.P. 113° C./2 mm.

4-isobutylphenylacetonitrile (30 g.), alcohol (100 ml.), 5 N sodium hydroxide (60 ml.) were refluxed for 6 hours and the alcohol removed by distillation. The residue was acidified with dilute hydrochloric acid and the precipitate collected in ether, extracted with dilute sodium carbonate solution, and the extrants acidified with dilute hydrochloric acid. The crystalline precipitate of 4-isobutylphenylacetic acid was collected, washed with water, dried in vacuo and recrystallised from light petroleum.

Example 7

To an ice cold stirred solution of anhydrous aluminium chloride (40.0 g.) in nitrobenzene (125 ml.) was slowly added ethyl oxalyl chloride (27.4 g.) followed by the dropwise addition of isobutylbenzene (36.1 g.). After stirring for 5 hours at room temperature the mixture was decomposed with cracked ice, ether (200 ml.) added and the organic phase washed with sodium hydrogen carbonate solution, water and distilled; B.P. 155° C./3 mm.

Ethyl 4-isobutylphenylglyoxylate (11.0 g.) was hydrogenated at room temperature and 2 atmospheres of hydrogen in the presence of palladium black (1.0 g.) and glacial acetic acid (80 ml.). When absorption of hydrogen had ceased, perchloric acid (7 g. of 70%) was added and hydrogenation continued until absorption was complete. The filtrate from the catalyst was treated with aqueous sodium hydroxide to neutralise the perchloric acid and acetic acid was distilled in vacuo below 50° C. The residue was hydrolysed by refluxing and stirring with 2 N-sodium hydroxide (50 ml.) for 6 hours, cooled and acidified with dilute hydrochloric acid, the precipitate of 4-isobutylphenylacetic acid collected, washed with water, dried in vacuo and recrystallised from light petroleum; (B.P. 62–68° C.).

Example 8

4-t-butylphenylacetic acid (1.35 g.) and benzylamine (0.75 g.) were mixed in ether (30 ml.) and the salt collected and recrystallised from absolute alcohol in colourless plates to give benzylamine 4-t-butylphenylacetate; M.P. 144–147° C. (Found: N, 4.8. $C_{19}H_{25}NO_2$ requires N, 4.7%.)

Example 9

N,N-diethylaminoethanol (10.0 g.) in dry ether (50 ml.) was added dropwise to a stirred solution of 4-t-butylphenylacetyl chloride (15.0 g.) in dry ether (100 ml.) at 0–5° C. After stirring for 1 hour at room temperature, water (20 ml.) was added and the ether extracted twice with 2 N hydrochloric acid. The aqueous solutions were combined, basified with 2 N sodium hydroxide and the oil isolated in ether washed with water, dried and distilled, B.P. 156–160° C./1.5 mm. 8.5 g., 34%. It was redistilled to give 2-diethylaminoethyl 4-t-butylphenylacetate as a practically colourless liquid B.P. 153–154° C./1.5 mm. (Found: N, 5.2. $C_{18}H_{29}NO_2$ requires N, 4.8%.)

Example 10

Ethyl 4-isobutylphenylacetate (15 g.) in dry ether (50 ml.) was added dropwise to a stirred solution of lithium aluminium hydride (3 g.) in ether (150 ml.). The mixture was refluxed for 1 hour, decomposed with dilute sulphuric acid; the ether was separated and washed with water, dried and distilled to give 2,4'-isobutylphenylethanol; B.P. 104° C./0.8 mm. (Found: C, 80.3; H, 10.0. $C_{12}H_{18}O$ requires C, 80.9; H, 10.1%.)

Example 11

4-isobutylphenylacetic acid (75 g.) absolute alcohol (500 ml.) and concentrated sulphuric acid (15 ml.) were refluxed for 4 hours. Excess alcohol was distilled in vacuo, the residue diluted with water and the ester was isolated in ether, washed with sodium carbonate solution then water before being dried and distilled to give as an oil ether 4-isobutylphenylacetate; B.P. 108–110° C./0.6 mm. (Found: C, 76.7; H, 9.2. $C_{14}H_{20}O_2$ requires C, 76.4; H, 9.1%.)

Example 12

2,4'-n-propylphenylpropionic acid (4 g.) absolute ethanol (20 ml.) and concentrated sulphuric acid (0.7 ml.) was refluxed for four hours, the alcohol was distilled off and the ester was isolated in ether. The ethereal solution was washed with sodium carbonate solution then water, dried and distilled to give ethyl 2,4'-n-propylphenylpropionate as an oil; B.P. 102° C./1 mm. (Found: C, 77.0; H, 9.3. $C_{14}H_{20}O_2$ requires C, 76.3; H, 9.7%.)

In a similar way the following esters were prepared from the corresponding acids.

Ethyl 2,4'-n-butylphenylpropionate; B.P. 120°/1.0 mm. (Found: C, 77.3; H, 9.4. $C_{15}H_{22}O_2$ requires C, 77.0; H, 9.4%.)

Ethyl 4-n-butylthiophenylacetate; B.P. 159–161° C./2.5 mm. (Found: S, 13.2. $C_{14}H_{20}O_2S$ requires S, 12.7%.)

Ethyl 2,4'-isopropoxyphenylpropionate. (Found: C, 70.0; H, 8.3. $C_{14}H_{20}O_3$ requires C, 70.25; H, 8.1%.)

Example 13

Ethyl 2,4'-n-propylphenylpropionate (4 g.) dissolved in ether (25 ml.) was added dropwise to a stirred solution of lithium aluminium hydride (1.7 g.) in dry ether (50 ml.). The mixture was refluxed for one hour, decomposed by the addition of water and dilute sulphuric acid and the alcohol isolated in ether. The ethereal solution was washed with water, dried and distilled to give 2-4'-n-propylphenylpropanol; B.P. 102° C./1 mm. (Found: C, 80.6; H, 10.2. $C_{12}H_{18}O$ requires C, 80.9; H, 10.1%.)

The following propanols were prepared similarly from the appropriate ester.

2-4'-n-butylphenylpropanol; B.P. 114° C./0.7 mm. (Found: C, 80.8; H, 10.4. $C_{13}H_{20}O$ requires C, 81.2; H, 10.4%.)

2,4'-allyloxyphenylpropanol; B.P. 102–103° C./0.07–0.08 mm. (Found: C, 74.9; H, 8.2; $C_{12}H_{16}O_2$ requires C, 75.0; H, 8.3%.)

Example 14

2,4'-butylphenylpropionic acid (5 g.) and thionyl chloride (10 ml.) were refluxed for 1 hour and excess thionyl chloride was distilled off under reduced pressure. The concentrate was added to concentrated ammonia solution (20 ml.) and the solid which separated was collected by filtration, washed with water, dried and crystallised from light petroleum (B.P. 80–100° C.) to give colourless plates of 2,4'-butylphenylpropionamide M.P. 104–107° C. (Found: N, 6.9. $C_{13}H_{19}NO$ requires N, 6.8%.)

The following amide was prepared similarly. 2,4'-propylphenylpropionamide M.P. 106–108° C. (Found: N, 7.2. $C_{12}H_{17}NO$ requires N, 7.3%.)

Example 15

2,4'-allyloxyphenylpropionic acid (9.3 g.), prepared as described in Example 4, was hydrogenated in the presence of a Pd/C catalyst (0.7 g.) at 50 lb./sq. in. in ethanol (200 ml.). The catalyst was filtered off, the solvent was distilled off and the residue was distilled in vacuo. The distillate solidified and was crystallised from light petroleum (B.P. 62–68° C.) to give 2,4'-n-propoxyphenylpropionic acid; M.P. 58–59.5° C. (Found: C, 69.7; H, 8.0. $C_{12}H_{16}O_3$ requires C, 69.3; H, 7.7%.)

In a similar way but starting from 2,4'-(but-2-enyloxy) phenylpropionic acid there was prepared 2,4'-n-butoxyphenylpropionic acid; B.P. 143° C./0.15 mm. (Found: C, 70.6; H, 8.2. $C_{13}H_{18}O_3$ requires C, 70.3; H, 8.1%.)

Example 16

Ethyl 4-hydroxyphenylacetate (25 g.), cyclopentyl iodide (82 g.), potassium carbonate (40 g.) and acetone were refluxed with stirring for 42 hours. The acetone and excess cyclopentyl iodide were distilled off in vacuo, the residue was dissolved in ether, washed with sodium hydroxide, sodium sulphite solution and finally water. The ether was evaporated and the residual oil was refluxed with sodium hydroxide (25 g.) in a mixture of ethanol (50 ml.) and water (100 ml.) for 15 hours. The ethanol was distilled off, water was added to the concentrate and it was acidified with sulphuric acid. The solid which separated was collected and crystallised from light petroleum (B.P. 62–68° C.) to give 4-cyclopentyloxyphenylacetic acid; M.P. 66–69° C. (Found: C, 71.0; H, 7.6. $C_{13}H_{16}O_3$ requires C, 70.9; H, 7.3%.)

Example 17

A mixture of thiophenetole (27.6 g.) and acetyl chloride (23.5 g.) in carbon disulphide (150 ml.) was cooled to −5° C. and aluminium chloride (30 g.) was added with stirring. The solution was stirred at 0° C. for 4 hours, ice and hydrochloric acid were added and the organic layer was separated, dried and distilled to give 4-ethylthioacetophenone; M.P. 42–43° C.

4-ethylthioacetophenone (18 g.), sulphur (6 g.) and morpholine (40 ml.) were refluxed for 7 hours, methanol (150 ml.) was added and the solution was poured into iced water (2 l.). The solid which separated was filtered off, washed with water, dissolved in hot ethanol (200 ml.) and hydrolysed by refluxing for 8½ hours with potassium hydroxide (30 g.) in water (80 ml.). The alcohol was distilled off and the residue was diluted with water and acidified with hydrochloric acid. The solid which separated was collected, washed with water and crystallised from 50% aqueous methanol to give 4-ethylthiophenylacetic acid; M.P. 77–78° C. (Found: S, 15.6. $C_{10}H_{12}O_2S$ requires S, 16.3%.)

In a similar way, the following acids were prepared from the corresponding 4-alkylthioacetophenones: 4-n-propylthiophenylacetic acid; M.P. 71–72° C. (Found: C, 63.4; H, 6.8; S, 15.7. $C_{11}H_{14}O_2S$ requires C, 62.9; H, 6.7; S, 15.25%.) 4-isopropylthiophenylacetic acid; M.P. 78–79° C. (Found: C, 63.1; H, 6.9; S, 15.1. $C_{11}H_{14}O_2S$ requires H, 6.7; S, 15.25%.) 4-n-butylthiophenylacetic acid; M. P. 72–73° C. (Found: C, 64.3; H, 7.3; S, 14.1. $C_{12}H_{16}O_2S$ requires C, 64.3; H, 7.1; S, 14.3%.)

Example 18

2,4′-propylphenylpropionamide (6.0 g.) prepared as described in Example 14 was Soxhlet extracted into a suspension of LiAlH₄ (2.0 g.) in ether (400 ml.). After refluxing for 10 hours the excess hydride was decomposed by adding water, the precipitated alumina was filtered off and the filtrate was extracted with very dilute hydrochloric acid. The aqueous extract was made alkaline with 5 N sodium hydroxide solution and the oil which separated was isolated in ether, the solution was dried and the ether was evaporated. The residual oil was distilled to give 2,4′-propylphenylpropylamine, B.P. 90° C./1 mm. (Found: C, 81.0; H, 11.2; N, 8.3. $C_{12}H_{19}N$ requires C, 81.3; H, 10.7; N, 7.9%.)

Example 19

An intimate mixture was prepared of equal parts of 4-isobutylphenylacetic acid and a tablet base comprising starch with the addition of 1% magnesium stearate as a lubricant. The mixture was compressed into tablets containing 2½ grains of 4-isobutylphenylacetic acid.

Similar tablets were also prepared but using as the active ingredient other compounds of the present invention such as 4-isobutylphenylpropionic acid or 4-cyclohexylphenylacetic acid.

Example 20

An intimate mixture was made of 5 parts of 4-isobutylphenylacetic acid and 3 parts of a tablet base comprising starch with the addition of 1% magnesium stearate as a lubricant. The mixture was compressed into tablets containing 5 grains of 4-isobutylphenylacetic acid.

Similar tablets were also prepared but using as the active ingredient other compounds of the invention such as 4-isobutylphenylpropionic acid or 4-cyclohexylphenylacetic acid.

Example 21

A mixture was prepared from the following ingredients:

Sodium 4-isobutylphenylacetate _____ g__ 13.7
Concentrated orange peel infusion _____ ml__ 62.5
Chloroform water to _____ ml__ 1,000

A dose of the above mixture is contained in 15 ml.

Example 22

A suspension was prepared from the following ingredients:

4-isobutylphenylacetic acid _____ g__ 13.7
Compound tragacanth powder _____ g__ 22.9
Chloroform water to _____ ml__ 1,000

A dose of the above suspension is contained in 15 ml.

Example 23

An elixir was prepared from the following ingredients:

Sodium 4-cyclohexylphenylacetate _____ g__ 13.7
Ethanol (90%) _____ ml__ 400
Glycerol _____ ml__ 333
Compound orange spirit _____ ml__ 33
Compound tartrazine solution _____ ml__ 10.4
Water to _____ ml__ 1,000
Dose—15 ml.

Example 24

An intimate mixture was prepared of equal parts of a tablet base comprising starch with the addition of 1% magnesium stearate as a lubricant and 2,4′-isopropylphenylpropionic acid. The mixture was compressed into tablets containing 2½ grains of 2,4′-isopropylphenylpropionic acid.

Example 25

A batch of capsules was prepared each capsule containing 1.5 grains of ethyl 2,4′-n-propylphenylpropionate.

We claim:
1. A compound selected from the group consisting of 2,4′-isobutyl phenyl propionic acid and 2,4′-cyclohexyl phenyl propionic acid.

References Cited

UNITED STATES PATENTS

| 3,135,784 | 6/1964 | Feder | 260—476 |
| 2,197,798 | 4/1940 | Sans | 260—476 |
| 2,935,448 | 5/1960 | Calder | 167—65 |
| 3,086,911 | 4/1963 | Brown | 167—65 |
| 2,193,944 | 3/1940 | Steindorff | 260—457 |

OTHER REFERENCES

Krauch et al., "Organic Named Reactions," John Wiley & Sons, Inc., New York, 1962, p. 302.

Wallinford et al., Jour. Am. Chem. Soc., vol. 63, pp. 2056–2059, 1941.

Corse et al., Jour. Am. Chem. Soc., vol 70, pp. 2837–2843, 1948.

Tchitchibabin et al., Bull. Soc. Chim. de France, 43, pp. 238–242, 1928.

LORRAINE A. WEINBERGER, *Primary Examiner.*

JULIAN S. LEVITT, *Examiner.*

P. SABATINE, T. L. GALLOWAY, *Assistant Examiners.*

Disclaimer 3,385,886.—*John Stuart Nicholson* and *Stewart Sanders Adams*, Nottingham, England. PHENYL PROPIONIC ACIDS. Patent dated May 28, 1968. Disclaimer filed Mar. 22, 1968, by the assignee, *Boots Pure Drug Company Limited*.

Hereby disclaims the terminal portion of the term of said patent subsequent to May 28, 1985.

[*Official Gazette July 2, 1968.*]